(No Model.)

W. J. WILLITS & E. B. LINSLEY.
CAR WHEEL.

No. 340,845.  Patented Apr. 27, 1886.

WITNESSES
Ed. A. Newman.
A. C. Newman.

INVENTORS
Warren J. Willits,
Edward B. Linsley,
By their Attorneys
Baldwin, Hopkins, & Peyton.

UNITED STATES PATENT OFFICE.

WARREN J. WILLITS AND EDWARD B. LINSLEY, OF THREE RIVERS, MICHIGAN, ASSIGNORS TO THE SHEFFIELD VELOCIPEDE CAR COMPANY, OF SAME PLACE.

CAR-WHEEL.

SPECIFICATION forming part of Letters Patent No. 340,845, dated April 27, 1886.

Application filed February 3, 1886. Serial No. 190,706. (No model.)

*To all whom it may concern:*

Be it known that we, WARREN J. WILLITS and EDWARD B. LINSLEY, both of Three Rivers, in the county of St. Joseph and State of Michigan, have invented a certain Improved Car-Wheel, of which the following is a specification, reference being had to the accompanying drawings, in which—

Figure 1:
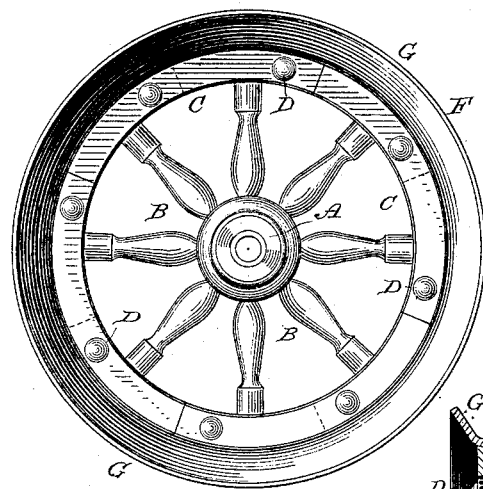
Figure 2:
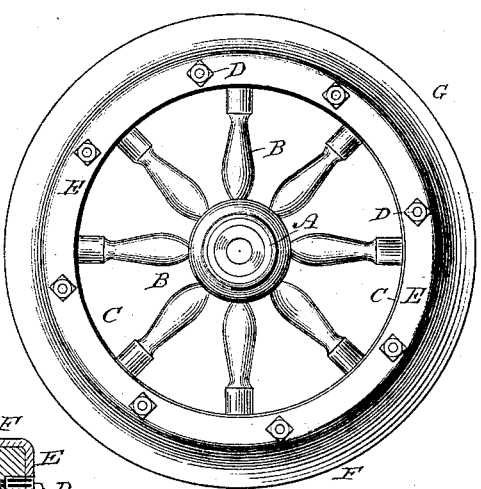
Figure 3:
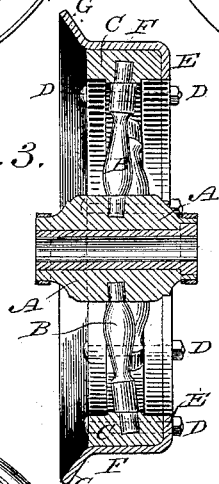
Figure 4:
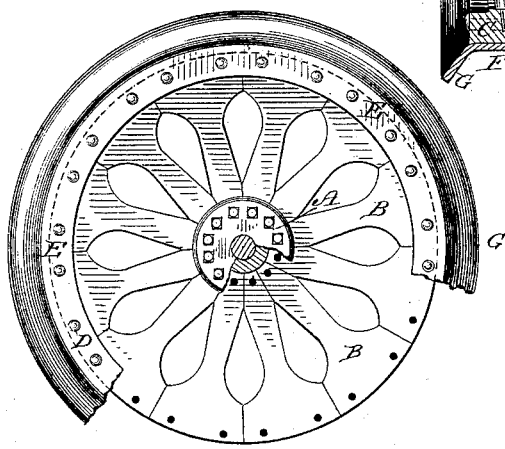
Figure 5:
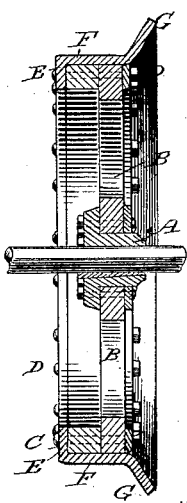

Figure 1 is a side view; Fig. 2, an opposite side view, and Fig. 3 is a diametrical section. Fig. 4 is a view of a car-wheel body such as shown in United States Patent No. 263,732; and Fig. 5 is a diametrical section of the same, showing the metal hub *e* and our improved tire.

Our object is to produce an improved car-wheel of the kind in which the tires are provided with the ordinary rail-flanges of railway-car wheels projecting outwardly, and another flange on the opposite side of the tire projecting inwardly, the latter serving in part at least to bolt the tire to the body of the wheel; but in making our tire we provide an inwardly-projecting flange not only upon the inside of the tire, as has been heretofore done, but upon the opposite edge of the tire from the outwardly-projecting rail-flange, and to serve as the exclusive means for bolting the tire to the wheel-body.

Our design is to produce a light wheel of the general character indicated for use chiefly in hand-cars or velocipede hand-cars, the body of which may be of wood, paper, or other light substance, with or without a metal hub. Our tire might of course be used with a metal body; but for lightness and cheapness we prefer other material.

We make our tire from the ordinary plate iron or steel, and either from bars rolled to desired width and thickness, and after being cut to proper length welded into a plain ring, or from a plate out of which may be cut a flat ring, either of which can be pressed and bent to shape at its opposite edges to form the flanges.

It will be observed that the inwardly-projecting flange of the tire is bolted only to the outer edge of the body of the wheel. This is because of the fact that we make only a light wheel, not required to sustain enormous weights, and hence do not require any separate metal ring on the side of wheel-body opposite the flange for the bolts to pass through, and do not require any shoulder to accommodate such a ring or plate upon the tire. Our tire is a mere shell into which the wheel-body is placed, and bolted only to the inwardly-projecting flange. By this means we reduce the metal necessary to constitute the tire to the minimum, whereby both economy of material and the least weight possible are secured, and at the same time we have sufficient strength for the purposes of the wheel we make.

Heretofore, so far as we are aware, the bolts have passed through the body of the tire, or else a ring or plate shouldered onto the tire opposite to the inwardly-projecting flange E, has been provided, and has been necessary. By the use of our tire, made in the manner described, the expense and other disadvantages of such constructions are avoided.

Heretofore tires having flanges of the character specified have been made either as shown in Patents Nos. 104,053 and 322,276 by casting or else rolling them from ingots or billets, the flanges being rolled from solid blocks. Our plan is much cheaper and better, and, in fact, is the only one practicable for thin light tires, such as we desire to make.

We form the body of the wheel preferably of wood, either using spokes driven into a wooden hub, as shown in Fig. 1, or triangular pieces placed upon an iron hub and forming a web, as shown in Fig. 4, and then secure to this central portion the tire by bolts passing through the outer edge of the wheel-body, and only through the inwardly-projecting flange of the tire.

Referring to the letters upon the drawings, A indicates the hub, of metal or wood; B, the spokes, or it may be a web, and C the felly or rim of the body of the wheel.

D indicates bolts passing through the rim of the wheel-body and the inwardly-projecting flange E of the tire F, which is also provided with the usual rail-flange, G. These flanges are formed by pressing and bending the opposite edges of a plain band of wrought metal or steel into shape, or from a disk of plate metal, as above indicated.

We thus obtain a tire of substantially uniform thickness of metal in its tread portion and in its flanges that has the advantages of wrought metal, and the thinness and lightness adapting it to such minimum cost and minimum fastening means for securing it to the wheel-body as are very desirable in light wheels designed for use in hand-cars, &c.

We are aware of the United States Patents of Stimpson, granted August 23, 1831, and of Hoover, granted July 15, 1884, No. 302,203, for car-wheels, and we do not claim the form of tire or the parts combined with the form of tire therein shown; but our invention is limited to the peculiar improvements above described and succinctly defined in the appended claims.

What we claim to be new, and desire to secure by Letters Patent of the United States, is—

1. Wrought plate-metal tire having outwardly and inwardly projecting flanges E and G, bent into shape from a plain tire-ring or from a circular plate, so that the whole tire is nearly of the same thickness, the inwardly-projecting flange E being provided, with bolt holes, substantially as set forth.

2. The combination, in a car-wheel, of the hub and body of the wheel with a tire having outwardly and inwardly projecting flanges E and G, and bolts D, passing only through the rim of the wheel-body and the flange E, substantially as set forth.

In testimony whereof we have hereunto subscribed our names.

WARREN J. WILLITS.
EDWARD B. LINSLEY.

Witnesses:
FREDERIC N. KINNEY,
ANNIE E. ARTHUR.